United States Patent [19]

Ruttenberg et al.

[11] Patent Number: 4,728,267
[45] Date of Patent: Mar. 1, 1988

[54] FLUID DRIVEN RECIPROCATING PUMP

[75] Inventors: Alexander Ruttenberg, Haifa; Alexander Zur, Kfar Bialik, both of Israel

[73] Assignee: T.M.B. Fertilizer Pumps Ltd., Kiryat Bialik, Haifa, Israel

[21] Appl. No.: 7,354

[22] Filed: Jan. 27, 1987

[30] Foreign Application Priority Data

Feb. 19, 1986 [IL] Israel .............................. 77935

[51] Int. Cl.⁴ .................................... F04B 43/06
[52] U.S. Cl. ............................ 417/395; 91/309; 91/312
[58] Field of Search .................. 417/393, 395, 401; 91/309, 304, 312, 329, 341 A

[56] References Cited

U.S. PATENT DOCUMENTS

| 2,679,209 | 5/1954 | Fischer et al. | 417/395 |
| 3,460,482 | 8/1969 | Jackson | 417/395 |
| 3,838,946 | 10/1974 | Schall | 417/395 |
| 4,021,149 | 5/1977 | Rutenberg et al. | 417/395 |
| 4,334,838 | 6/1982 | Fessler et al. | 417/395 |

Primary Examiner—Leonard E. Smith
Assistant Examiner—Leonard P. Walnoha
Attorney, Agent, or Firm—Benjamin J. Barish

[57] ABSTRACT

A fluid driven reciprocating pump comprises a pair of heads each containing a displaceable member defining a drive chamber and a pump chamber on opposite sides of the diaphragm in one head, and a drive chamber and an inactive chamber on opposite sides of the diaphragm in the other head. A mechanical coupling connects the two displaceable members for reciprocation together; and a control valve assembly connects the drive chambers of both heads to a source of pressurized fluid for driving them through forward strokes, a spring driving the heads through return strokes.

15 Claims, 2 Drawing Figures

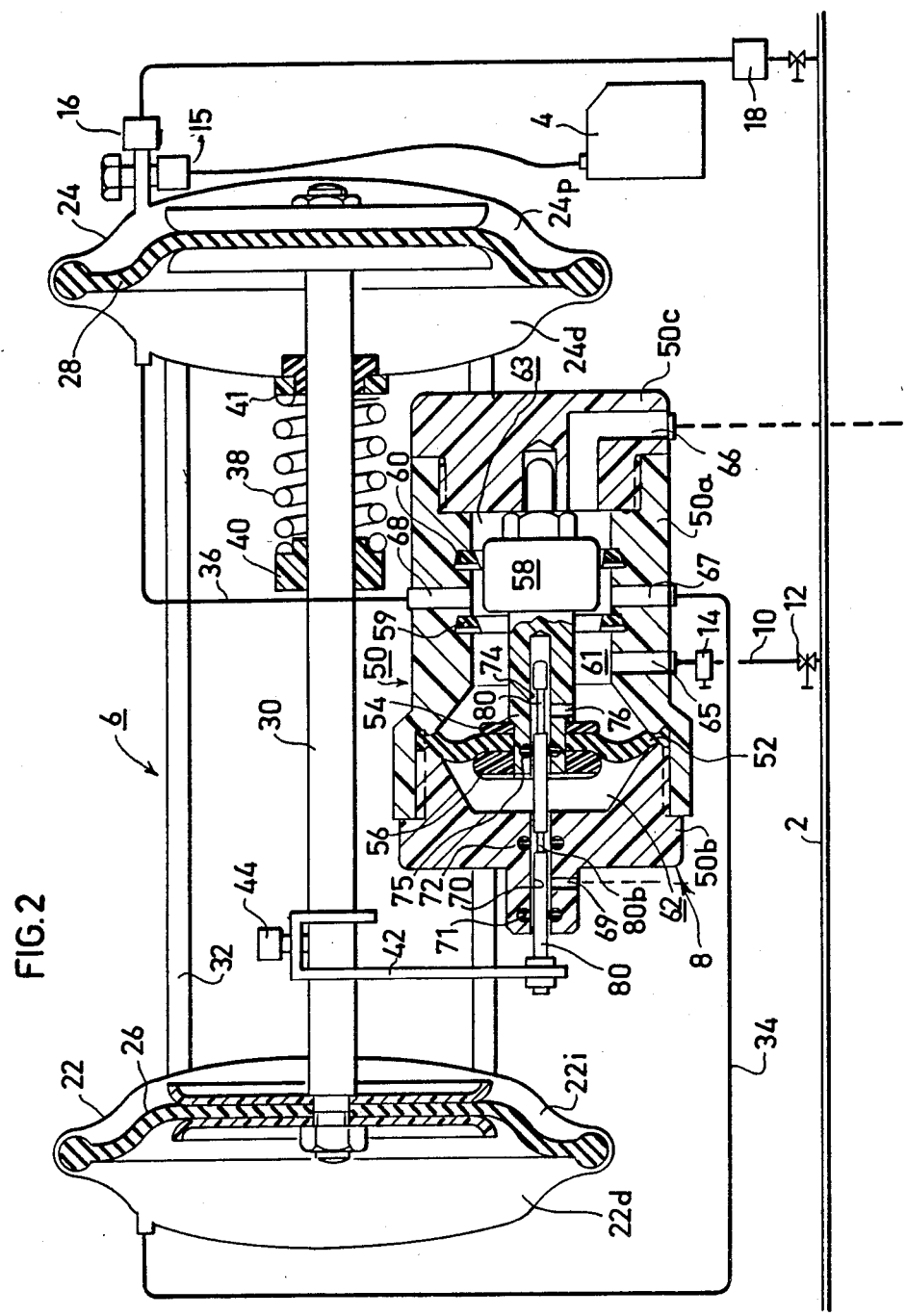

FLUID DRIVEN RECIPROCATING PUMP

BACKGROUND OF THE INVENTION

The present invention relates to fluid driven reciprocating pumps. The invention is particularly applicable to the type of reciprocating pump illustrated in our prior U.S. Pat. Nos. 4,021,149 and 4,548,551, and is therefore described below with respect to this application.

The above two patents describe a reciprocating pump including a pair of heads controlled by a main distribution valve, which latter valve is in turn controlled by a pilot valve. An object of the present invention is to provide a fluid driven reciprocating pump of the above type but of simpler construction enabling manufacture and maintenance of the pump at lower cost. More particularly, an object of the invention is to provide a pump of the above type but having a simplified control valve arrangement in which the functions of both the main distribution valve and the pilot valve are performed by a single, simplified control valve assembly.

SUMMARY OF THE INVENTION

According to the present invention, there is provided a fluid driven reciprocating pump comprising: a pair of heads each containing a displaceable member, defining a drive chamber and a pump chamber on opposite sides of the displaceable member in one head, and a drive chamber and an inactive chamber on opposite sides of the displaceable member in the other head; a first mechanical coupling connecting the two displaceable members for reciprocation together; a control valve assembly connecting the drive chambers of both heads to a source of pressurized fluid for driving them through forward strokes; a spring for driving the heads through return strokes; and means connecting the pump chamber of said one head to a source of material to be pumped; the control valve assembly comprising: a housing having a displaceable diaphragm defining a pressure chamber and a control chamber on opposite sides thereof; an inlet port leading to the pressure chamber for connecting it to the source of pressurized fluid; a drain port leading to the control chamber for draining the control chamber; outlet port means leading from the pressure chamber for connecting it to the drive chambers of the two heads; a main valve coupled to the displaceable member of the control valve assembly so as to be movable thereby either to an open position establishing communication between the pressure chamber and the outlet port means to drive the pump through its forward strokes, or to a drain position to permit the spring to drive the pump through its return strokes; a pilot valve member within the housing and comprising a stem passing through the diaphragm; and a second mechanical coupling connecting the pilot valve member stem to the first mechanical coupling so as to be moved thereby at the end of the pump forward strokes to establish communication between the control chamber and the drain port to drain the control chamber, and at the end of the return strokes to interrupt the communication and thereby to permit the control chamber to rise to the pressure of the pressure chamber to move the main valve member to its open position and to cause the pressurized water to drive the pump through its forward strokes.

According to further features in the preferred embodiment of the invention described below, the pilot valve stem is formed with an annular recess cooperable with a seal carried by the diaphragm effective to establish communication between the control chamber and the drain port at the end of the pump return strokes, and to interrupt this communication at the end of the pump forward strokes.

According to still further features in the described preferred embodiment, the main valve is coupled to the diaphragm by a stem carried by the diaphragm, the pilot valve stem being movable within a bore formed in the main valve stem; also, the housing includes a further drain port, and the main valve is a piston movable within the housing from an open position connecting the outlet port means to the pressurized chamber of the control valve assembly, or to a closed position connecting the outlet port means to the further drain port of the control valve assembly.

It will thus be seen that in the fluid driven reciprocating pump constructed in accordance with the foregoing features, the functions of both the main distribution valve and the pilot valve in the pumps of the above-cited patents are performed by the control valve assembly of the present invention which thereby substantially simplifies the overall construction and reduces the manufacturing and maintenance costs.

Further features and advantages of the invention will be apparent from the description below.

BRIEF DESCRIPTION OF THE DRAWINGS

The invention is herein described, by way of example only, with reference to the accompanying drawings, wherein:

FIG. 2 illustrates the pump of FIG. 1 but with the parts in the condition at the end of the forward stroke of the pump before the valve assembly has been actuated to initiate the return stroke.

DESCRIPTION OF A PREFERRED EMBODIMENT

Figure 1:
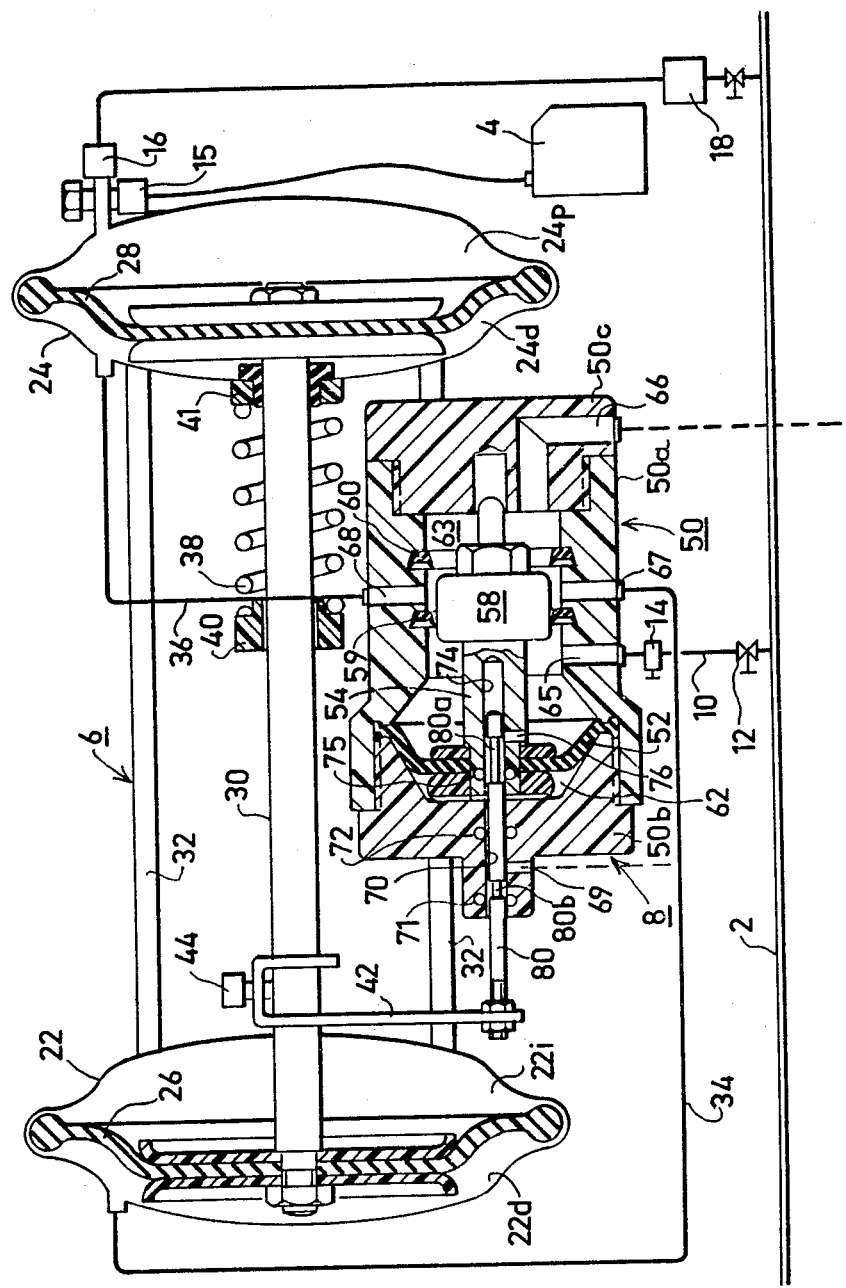
FIG. 1 illustrates one form of reciprocating pump constructed in accordance with the present invention, the parts being illustrated in their positions at the end of the end stroke of the pump before the valve assembly has been actuated to initiate the forward stroke of the pump.

The pump illustrated in FIGS. 1 and 2 of the drawings is particularly for use in a water irrigation system, wherein the pump is to be driven by the pressurized water from the supply line 2 to pump fertilizer from a source 4 into the supply line. The pump includes two main components, namely a pump assembly, generally designated 6; and a control valve assembly, generally designated 8. The control valve assembly 8 is connected to the pressurized water supply line 2 via an inlet line 10, an on-off valve 12 and a regulating valve 14. The control valve assembly directs the pressurized water to the pump assembly 6 to drive it at a rate determined by the setting of regulating valve 14, and thereby to pump fertilizer from source 4, via a suction valve 15, a delivery valve 16 and a blocking valve 18, into the water of the supply line 2.

Valves 12, 14 15 and 16 may be of conventional construction, for example as described in the above-cited patents. The remainder of the description, therefore, will be directed to the construction and operation of the pump assembly 6 and the control valve assembly 8.

The pump assembly 6 includes two heads 22, 24 each provided with a displaceable member in the form of a diaphragm 26, 28 mechanically coupled for reciprocation together by a connecting rod 30. The two heads are mechanically secured together by a plurality of tie rods 32. These tie rods may also be used for mounting the control valve assembly 8.

Diaphragm 26 in head 22 divides its interior into a driving chamber 22d and a pumping chamber an inactive chamber 22i. Similarly, diaphragm 28 of head 24 divides that head into a drive chamber 24d and a pump chamber 24p connected to the fertilizer source 4 via suction valve 15. The drive chambers 22d, 24d of the two heads 22, 24 are connected by fluid lines 34, 36 to the control valve assembly 8 so as to be driven through the forward strokes by the pressurized fluid in the water supply line 2. The two pumps are driven through their return strokes by a spring 38 interposed between a ring 40 fixed to connecting rod 30 and a collar 41 fixed to head 24. The arrangement is such that during the forward strokes, when the heads are driven by the pressurized water in the supply line, spring 38 is compressed to store energy, which energy is released to drive the pumps during the return strokes.

A mechanical connection 42 connects rod 30 to the valve assembly 8 so that the valve assembly is controlled according to the reciprocations of the pump. Connection 42 is adjustably attached by screw 44 to connecting rod 30 to permit adjustment of this connection.

The control valve assembly 8 comprises a housing 50 constituted of a central hollow section 50a closed at its opposite ends by threadedly applied end caps 50b, 50c. A diaphragm 52 is clamped between end cap 50b and one end of housing section 50a. One end of a stem 54 is secured to the central region of diaphragm 52 by a fastener 56, and the opposite end of stem 54 carries a piston 58 movable, upon deflection of the diaphragm, to engage either a first sealing ring 59 (FIG. 1) or a second sealing ring 60 (FIG. 2).

The interior of housing 50 is divided into a first chamber 61 (FIG. 2) between diaphragm 54 and piston 58, a second chamber 62 between the opposite side of diaphragm 54 and end cap 50b, and a third chamber 63 between the opposite side of piston 58 and end cap 50c. Chamber 61 serves as a pressure chamber as it is continuously supplied with the pressurized water from the water supply line 2 via the inlet line 10 and port 65. Chamber 62 serves as a control chamber, as its pressure is varied, as will be described below, in order to control the deflection of diaphragm 52. Chamber 63, on the opposite side of piston 58, serves as a drain chamber as, when the piston is in the position illustrated in FIG. 1, the driving fluid from the pump assembly 6 is drained to the atmosphere via this chamber 63 and a drain port 66 formed in the housing end cap 50c.

In addition to inlet port 65 and drain port 66, the control valve assembly 8 includes a pair of outlet ports 67, 68 connected to the outlet lines 34, 36 respectively, and a further drain port 69 for draining control chamber 62. The outlet ports 67 and 68 are formed in the main housing section 50a between the two sealing rings 59, 60. Drain port 69 is formed in end cap 50b and communicates with a bore 70 formed through the end cap and straddled on two opposite sides by two sealing rings 71, 72.

Piston 58 serves the function of the main valve member and is carried by stem 54 so as to be moved by the deflection of diaphragm 52 either to an open position establishing communication between the pressure chamber 61 and the outlet ports 67, 68, or to a closed position terminating such communication and in turn establishing communication between ports 67, 68 and drain 66 via chamber 63. Stem 54 carrying valve member 58 is also formed with a bore 74 aligned with bore 70 formed in the housing end cap 50b. Stem 54 further includes a sealing ring 75 lining bore 74. Stem 54 is further formed with a radial bore 76 joined to the axial bore 74 at the chamber 61 side of diaphragm 52.

A further stem 80 is passed through bore 70 in end cap 50b and bore 74 in stem 54. Stem 80 is mechanically connected to link 42 so as to be moved with connecting rod 30 during the reciprocations of the pump. Stem 80 is formed with a first annular groove 80a effective, in one position of stem 80 (that illustrated in FIG. 1) to connect pressure chamber 61 to control chamber 62, and with a second annular groove 80b effective, during one position of the stem (that illustrated in FIG. 2) to connect the control chamber 62 to the drain port 69. Stem 80 thus serves as a pilot valve mechanically connected to connecting rod 30 of the pump assembly 6 for controlling the operation of the control valve assembly 50, and particularly of the main valve 58 which controls the supply of the pressurized water to the heads 22, 24 of the pumping assembly 6.

The illustrated pump operates as follows:

FIG. 1 illustrates the condition of the parts at the end of the return stroke of the pump, before the pilot valve (stem 80) has been actuated to move diaphragm 52 to initiate the forward stroke by moving the main valve member 58 to its open condition for directing the pressurized water from the water supply line 2 via pressure chamber 61 to the drive chambers 22d, 24d of the pump assembly 6. Thus, as shown in FIG. 1, the two diaphragms 26, 28 of the heads 22, 24 are in their leftmost condition; spring 38 is relaxed; and stem 54 connected to diaphragm 52 of the control valve assembly 50 is in its leftmost condition. Also, pump chamber 24p is filled with fertilizer from source 4 drawn into the pump chamber during the previous stroke.

In this condition of the control valve assembly diaphragm 52, the pressurized water from supply line 2 is supplied, via inlet port 65, pressure chamber 61, port 76, and the clearance between stem 80 and the bore in stem 54, to the control chamber 62 on the opposite side of pressure chamber 61; drain port 69 is closed by the engagement of seal 72 with stem 80. Accordingly, the pressure within control chamber 62 increases to that of the pressure chamber 61, causing diaphragm 52 to flex, as shown in FIG. 2, thereby moving stem 54 and valve member 58 rightwardly until the valve member engages seal 60. This is the position of diaphragm 52 and valve member 58 illustrated in FIG. 2; it will be seen that the pressurized water in chamber 61 is directed via outlet ports 67, 68 to the two drive chambers 22d, 24d of the pump assembly 6. Diaphragms 26, 28 of the heads 22, 24 are thus driven rightwardly pumping the fertilizer material in pump chamber 24p, via suction valve 15, delivery valve 16 and blocking valve 18, into the water passing through the supply line 2.

FIG. 2 illustrates the condition of the pumping diaphragms 26, 28 at the end of the forward stroke, before the valve assembly has been actuated to initiate the return stroke. In this condition, spring 38 is compressed, and control chamber 62 is vented to the drain port 69 via annular recess 80b formed in stem 80. This causes the fluid within chamber 62 to be vented to the atmosphere via drain port 69, whereby the pressure within pressure chamber 61 moves diaphragm 52 back to the position illustrated in FIG. 1. This movement of the diaphragm also moves main valve 58 from the position illustrated in FIG. 2 to the position illustrated in FIG. 1, whereupon the drive chambers 22d, 24d of the pumping assembly 6 are disconnected from the pressure chamber 61 of the valve assembly 8, but rather are connected via drain chamber 63 and drain port 66 to the atmosphere. Accordingly, spring 38, previously compressed during the forward stroke, now drives the two diaphragms 26, 28 leftwardly through the return stroke, the fluid within the drive chambers of the two heads 22, 24 being drained to the atmosphere via drain chamber 63 and drain port 66.

During the return stroke, fertilizer solution is drawn from source 4 into pump chamber 24p of head 24 via the suction (non-return) valve 15, for discharge therefrom during the next forward stroke. Only chamber 24p of head 24 is thus used for pumping the fertilizer, whereas chambers 22d and 24d of both heads 22, 24 are used for driving the pump assembly, in order to use the pressure of the supply line 2 to provide sufficient energy for injecting the fertilizer into the pressurized water of the supply line.

At the end of the return stroke, the parts are as illustrated in FIG. 1 preparatory to the start of a new forward stroke.

Blocking valve 18 prevents the drain by gravity of the fertilizer from source 4 (when placed at a higher elevation than the pump) into line 2 when irrigation is terminated and the pressure in line 2 is removed. The structure of blocking valve 18, as well as that of suction valve 15 and delivery valve 16, may be the same as described in the above-cited patents.

It will be appreciated that while the invention has been described with respect to one preferred embodiment, many variations, modifications and other applications of the invention may be made.

What is claimed is:

1. A fluid driven reciprocating pump, comprising:
   a pair of heads each containing a displaceable member defining a drive chamber and a pump chamber on opposite sides of the displaceable member in one head, and a drive cahmber and an inactive chamber on opposite sides of the displaceable member in the other head;
   a first mechanical coupling connecting the two displaceable members for reciprocation together;
   a control valve assembly connecting the drive chambers of both heads to a source of pressurized fluid for driving them through forward strokes;
   a spring for driving said heads through return strokes;
   and means connecting the pump chamber of said one head to a source of material to be pumped;
   said control valve assembly comprising:
   a housing having a displaceable diaphragm defining a pressure chamber and a control chamber on opposite sides thereof;
   an inlet port leading to said pressure chamber for connecting it to said source of pressurized fluid;
   a drain port leading to said control chamber for draining said control chamber;
   outlet port means leading from said pressure chamber for connecting it to the drive chambers of the two heads;
   a main valve coupled to said diaphragm of the control valve assembly so as to be movable thereby either to an open position establishing communication between said pressure chamber and said outlet port means to drive said pump through its forward strokes, or to a drain position interrupting said communication and thereby to permit said spring to drive the pump through its return strokes;
   a pilot valve member within said housing and comprising a stem passing through said diaphragm;
   and a second mechanical coupling connecting said pilot valve member stem to said first mechanical coupling so as to be moved thereby at the end of the pump forward strokes to establish communication between said control chamber and said drain port to drain said control chamber, and at the end of the return strokes to interrupt said communication and thereby to permit the control chamber to rise to the pressure of the pressure chamber to move the main valve member to its open position and to cause the pressurized water to drive the pump through its forward strokes.

2. The pump according to claim 1, wherein said pilot valve stem is formed with an annular recess cooperable with a seal carried by said diaphragm effective to establish communication between said control chamber and said drain port at the end of the pump return strokes, and to interrupt said communication at the end of the pump forward strokes.

3. The pump according to claim 1, wherein said main valve is coupled to said diaphragm by a stem carried by said diaphragm, said pilot valve stem being movable within a bore formed in said main valve stem.

4. The pump according to claim 1, wherein said housing includes a further drain port, and said main valve is a piston movable within the housing from an open position connecting said outlet port means to said pressurized chamber of the control valve assembly, or to a closed position connecting said outlet port means to said further drain port of the control valve assembly.

5. The pump according to claim 4, wherein said housing comprises a central cylindrical section formed with said inlet and outlet ports, a first end cap attached to one end of said central housing section and clamping the diaphragm thereto, which end cap is formed with said first drain port, and a second end cap attached to the opposite end of the central housing section and formed with said further drain port.

6. The pump according to claim 1, wherein said outlet port means comprises two ports formed in said housing of the control valve assembly, each of said two ports being connected to one of said drive chambers of the two heads.

7. The pump according to claim 1, wherein said first mechanical coupling comprises a connecting rod coupling the pump displaceable members to reciprocate together.

8. The pump according to claim 1, wherein said source of pressurized fluid is a pressurized water supply line, and said source of material to be pumped is a source of fertilizer to be injected into the supply water.

9. A fluid driven reciprocating pump, comprising:
   a pair of heads each containing a displaceable member defining a drive chamber and a pump on opposite sides of the displaceable member in one head, and a drive chamber and an inactive chamber on opposite sides of the displaceable member in the other head;

a first mechanical coupling connecting the two displaceable members for reciprocation together;

a control valve assembly connecting the drive chambers of both heads to a source of pressurized fluid for driving them through forward strokes;

a spring for driving said heads through return strokes;

and means connecting the pump chamber of said one head to a source of material to be pumped;

said control valve assembly comprising:

a housing having a displaceable diaphragm defining a pressure chamber and a control chamber on opposite sides thereof;

an inlet port leading to said pressure chamber for connecting it to said source of pressurized fluid;

a drain port leading to said control chamber for draining said control chamber;

outlet port means leading from said pressure chamber for connecting it to the drive chambers of the two heads;

a main valve coupled to said diaphragm of the control valve assembly so as to be movable thereby either to an open position establishing communication between said pressure chamber and said outlet port means to drive said pump through its forward strokes, or to a drain position interrupting said communication and thereby to permit said spring to drive the pump through its return strokes;

a pilot valve member within said housing and comprising a stem passing through said diapragm;

a second mechanical coupling connecting said pilot valve member stem to said first mechanical coupling so as to be moved thereby at the end of the pump forward strokes to establish communication between said control chamber and said drain port to drain said control chamber, and at the end of the return strokes to interrupt said communication and thereby to permit the control chamber to rise to the pressure of the pressure chamber to move the main valve member to its open position and to cause the pressurized water to drive the pump through its forward strokes;

and a further drain port within said housing; said main valve being a piston movable within the housing from an open position connecting said outlet port means to said pressurized chamber of the control valve assembly, or to a closed position connecting said outlet port means to said further drain port of the control valve assembly.

10. The pump according to claim 9, wherein said pilot valve stem is formed with an annular recess cooperable with a seal carried by said diaphragm effective to establish communication between said control chamber and said drain port at the end of the pump return strokes, and to interrupt said communication at the end of the pump forward strokes.

11. The pump according to claim 9, wherein said main valve is coupled to said diaphragm by a stem carried by said diaphragm, said pilot valve stem being movable within a bore formed in said main valve stem.

12. The pump according to claim 9, wherein said housing comprises a central cylindrical section formed with said inlet and outlet ports, a first end cap attached to one end of said central housing section and clamping the diaphragm thereto, which end cap is formed with said first drain port, and a second end cap attached to the opposite end of the central housing section and formed with said further drain port.

13. The pump according to claim 9, wherein said outlet port means comprises two ports formed in said housing of the control valve assembly, each of said two ports being connected to one of said drive chambers of the two heads.

14. The pump according to claim 9, wherein said first mechanical coupling comprises a connecting rod coupling the pump displaceable members to reciprocate together.

15. The pump according to claim 9, wherein said source of pressurized fluid is a pressurized water supply line, and said source of material to be pumped is a source of fertilizer to be injected into the supply water.

* * * * *